No. 810,688. PATENTED JAN. 23, 1906.
E. W. TURNER.
CHURN.
APPLICATION FILED JULY 28, 1905.

Witnesses
E. H. Stewart
C. N. Woodward

Edward W. Turner, Inventor.
by C. A. Snow & Co.
Attorneys

UNITED STATES PATENT OFFICE.

EDWARD W. TURNER, OF SWANSBORO, VIRGINIA, ASSIGNOR OF ONE-HALF TO GEORGE M. ROGERS, OF RICHMOND, VIRGINIA.

CHURN.

No. 810,688.     Specification of Letters Patent.     Patented Jan. 23, 1906.

Application filed July 28, 1905. Serial No. 271,672.

*To all whom it may concern:*

Be it known that I, EDWARD W. TURNER, a citizen of the United States, residing at Swansboro, in the county of Chesterfield and State of Virginia, have invented a new and useful Churn, of which the following is a specification.

This invention relates to churns, and has for its object to improve the construction and increase the efficiency of devices of this character.

With these and other objects in view, which will appear as the nature of the invention is better understood, the same consists in certain novel features of constructions, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

Figure 1:
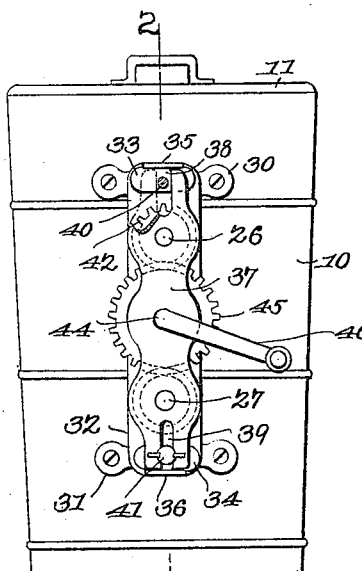
Figures 2, 3:
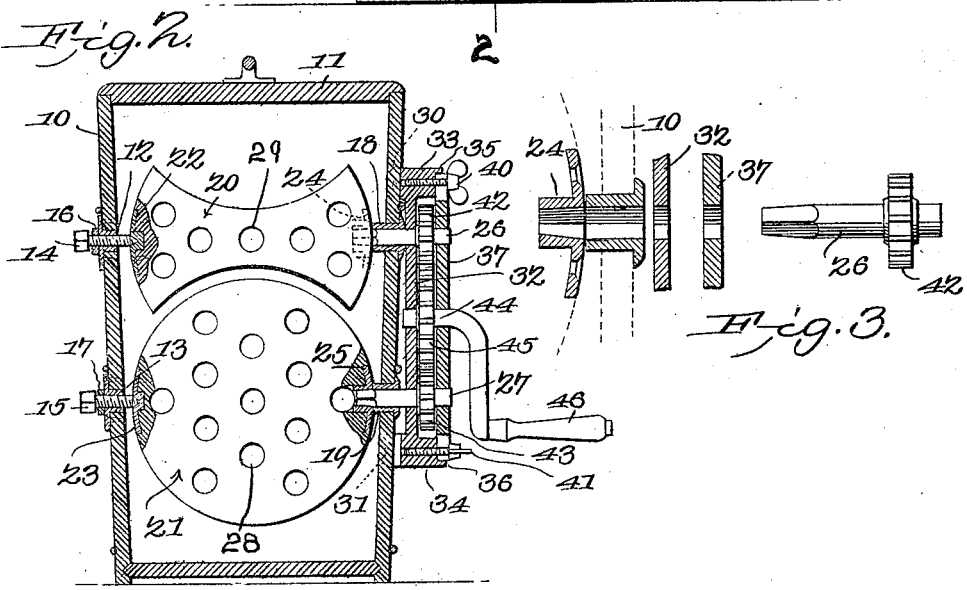

In the drawings thus employed, Figure 1 is a side elevation of the improved device, partly in section. Fig. 2 is a sectional elevation on the line 2 2 of Fig. 1. Fig. 3 represents enlarged sectional details of one set of the shaft-bearings and one of the dasher-operating shafts.

In the improved device is comprised a receptacle 10 for the milk or cream, which may be of any desired size or capacity and of any required shape, but will preferably be of circular shape and with a detachable closure 11. Extending through one of the side walls of the receptacle are spaced studs 12 13, having threaded apertures for receiving threaded pivot-studs 14 15, the studs preferably provided with jam-nuts 16 17 to increase their security. Extending through the opposite walls of the receptacle are bearing-studs 18 19, and between these two sets of studs dashers 20 21 are disposed, the dashers having "center" plates 22 23 at one end to receive the terminals of the pivot-pins 14 15 and sockets 24 25 in the other ends to receive the squared ends of shafts 26 27, journaled in the bearing-studs 18 19. The dasher 21 is of greatest width centrally, preferably in circular or disk form, and with numerous transverse apertures 28, and the dasher 20 is in plate form and of greatest width at the ends and contracted centrally, and also with numerous transverse apertures 29, the contracted edges of the dasher 20 conforming to the periphery of the dasher 21, as shown in Fig. 2. The dashers 20 21 are thus mounted to rotate horizontally.

Attached at 30 31 to the receptacle 10 is a base-plate 32, having outwardly-extending flanges 33 34 at the ends and with seats 35 36 upon the flanges to receive the ends of a supporting-plate 37, the latter thus maintained spaced from the base-plate and parallel thereto. The supporting-plate 37 is provided with longitudinal slots 38 39 at the ends through which clamp-screws 40 41 operate to detachably couple the plate 37 to the base-plate 32. The base-plate 32 and the supporting-plate 37 are provided with transverse bearings to receive the shafts 26 27, and mounted upon these shafts between the plates are gear-wheels 42 43, and journaled in the plates 32 37 is a shaft 44, having a gear-wheel 45 interengaging with both the wheels 42 43, the shaft 44 also provided with an operating-crank 46. By this arrangement when the crank 46 is operated the dashers 20 21 will simultaneously rotate and in the same direction. The dasher 21 being of the greatest width centrally in rotating moves the milk or cream outwardly, or toward the sides of the receptacle, while the dasher 20 being largest at the ends and smallest at the center moves the milk or cream inwardly toward the center, so that as the two dashers are rapidly rotated in close proximity, the cream or milk is most thoroughly agitated and commingled and acted upon in the most favorable manner to cause the rapid separation of the butter particles.

The parts are easily separable for thorough cleansing and the dashers are also interchangeable, so that the larger dasher may be arranged at the lower point, as in Fig. 2, or the dashers reversed in position when a smaller quantity of milk or cream is to be churned. The threaded pivot-pins 14 15 provide a ready means for taking up wear and prevent looseness or rattling. The shafts 26 27 will fit the bearings 18 19 liquid-tight or with "ground" joints.

The device may be readily adapted to any-sized churn, as will be obvious.

Having thus described the invention, what is claimed is—

In a churn, a receptacle having spaced bearings through one of its side walls, a base-plate attached to said receptacle and with outwardly-extending flanges at the ends and having bearings opposite the bearings in said receptacle and also with an intermediate bearing, a supporting-plate seated at the ends upon the flanges of said base-plate and provided with bearings in alinement with the bearings in said base-plate, dasher members having sockets in one end and disposed within said receptacle, shafts journaled in the bearings in said receptacle and in the bearings in said plates and engaging the sockets in said dasher members a shaft journaled in the intermediate bearings in said plates and provided with an operating-crank interengaging gear-wheels upon said shafts and means for detachably coupling said supporting-plate to said base-plate.

In testimony that I claim the foregoing as my own I have hereto affixed my signature in the presence of two witnesses.

EDWARD W. TURNER.

Witnesses:
 WM. T. MARTIN,
 JAS. S. BECK.